(12) United States Patent
Coffetti

(10) Patent No.: US 11,684,203 B2
(45) Date of Patent: Jun. 27, 2023

(54) BEVERAGE VENDING MACHINE

(71) Applicant: CARIMALI S.P.A., Bergamo (IT)

(72) Inventor: Marcello Coffetti, Chignolo d'Isola (IT)

(73) Assignee: CARIMALI S.P.A., Bergamo (IT)

( * ) Notice: Subject to any disclaimer, the term of this patent is extended or adjusted under 35 U.S.C. 154(b) by 387 days.

(21) Appl. No.: 16/756,956

(22) PCT Filed: Oct. 19, 2018

(86) PCT No.: PCT/IB2018/058159
§ 371 (c)(1),
(2) Date: Apr. 17, 2020

(87) PCT Pub. No.: WO2019/077578
PCT Pub. Date: Apr. 25, 2019

(65) Prior Publication Data
US 2021/0196075 A1 Jul. 1, 2021

(30) Foreign Application Priority Data

Oct. 19, 2017 (EP) .................................... 17197408
Jan. 16, 2018 (IT) ....................... 102018000001118

(51) Int. Cl.
*A47J 31/00* (2006.01)
*A47J 31/44* (2006.01)
*A47J 31/46* (2006.01)

(52) U.S. Cl.
CPC ....... *A47J 31/4485* (2013.01); *A47J 31/4489* (2013.01); *A47J 31/469* (2018.08)

(58) Field of Classification Search
CPC .. A47J 31/4485; A47J 31/4489; A47J 31/469; A47J 31/44

(Continued)

(56) References Cited

U.S. PATENT DOCUMENTS

| 5,738,002 A | 4/1998 | Murano-Ducarne |
| 2007/0048428 A1* | 3/2007 | Green ................. A47J 31/4485 426/564 |

(Continued)

FOREIGN PATENT DOCUMENTS

| DE | 102006043905 A1 | 4/2008 |
| WO | 2012107357 A1 | 8/2012 |

(Continued)

OTHER PUBLICATIONS

International Search Report dated Feb. 18, 2019 for PCT application No. PCT/IB2018/058159.

(Continued)

*Primary Examiner* — Helena Kosanovic
*Assistant Examiner* — Thao Uyen Tran-Le
(74) *Attorney, Agent, or Firm* — Ruggiero McAllister & McMahon LLC

(57) ABSTRACT

A milk frother/heater for a milk supply circuit in a beverage vending machine has a hollow body and integrally has a first appendage defining a milk inlet to receive smooth milk or a milk-air mixture, a second appendage defining a steam inlet to receive steam, and a third appendage defining a milk outlet to deliver milk. The body internally defines a mixing chamber, and the milk inlet, the steam inlet and the milk outlet internally define a milk inlet passage, a steam inlet passage, and a milk outlet passage, respectively, fluidly communicating with the mixing chamber. The mixing chamber has an axis extending from a first closed axial end to a second axial end where the steam inlet passage and the milk outlet passage converge. The milk inlet passage converges at the second axial end or merges with the steam inlet passage upstream from the mixing chamber.

12 Claims, 2 Drawing Sheets

(58) Field of Classification Search
USPC .......................................................... 99/293
See application file for complete search history.

(56) References Cited

U.S. PATENT DOCUMENTS

| | | | | |
|---|---|---|---|---|
| 2009/0104336 A1* | 4/2009 | Fraij | ................... | A47J 31/4485 |
| | | | | 99/275 |
| 2011/0127354 A1* | 6/2011 | Cubero | ................... | A47J 43/12 |
| | | | | 239/310 |
| 2013/0040028 A1* | 2/2013 | Doppe | ................ | A47J 31/4485 |
| | | | | 99/452 |
| 2015/0097303 A1 | 4/2015 | Zhang | | |
| 2016/0015206 A1* | 1/2016 | Holten | ................ | B01F 23/2323 |
| | | | | 261/79.1 |

FOREIGN PATENT DOCUMENTS

| | | | | |
|---|---|---|---|---|
| WO | WO-2016151422 A1 * | 9/2016 | .............. | A23P 30/40 |
| WO | 2017001012 A1 | 1/2017 | | |

OTHER PUBLICATIONS

Written Opinion dated Feb. 18, 2019 for PCT application No. PCT/IB2018/058159.

\* cited by examiner

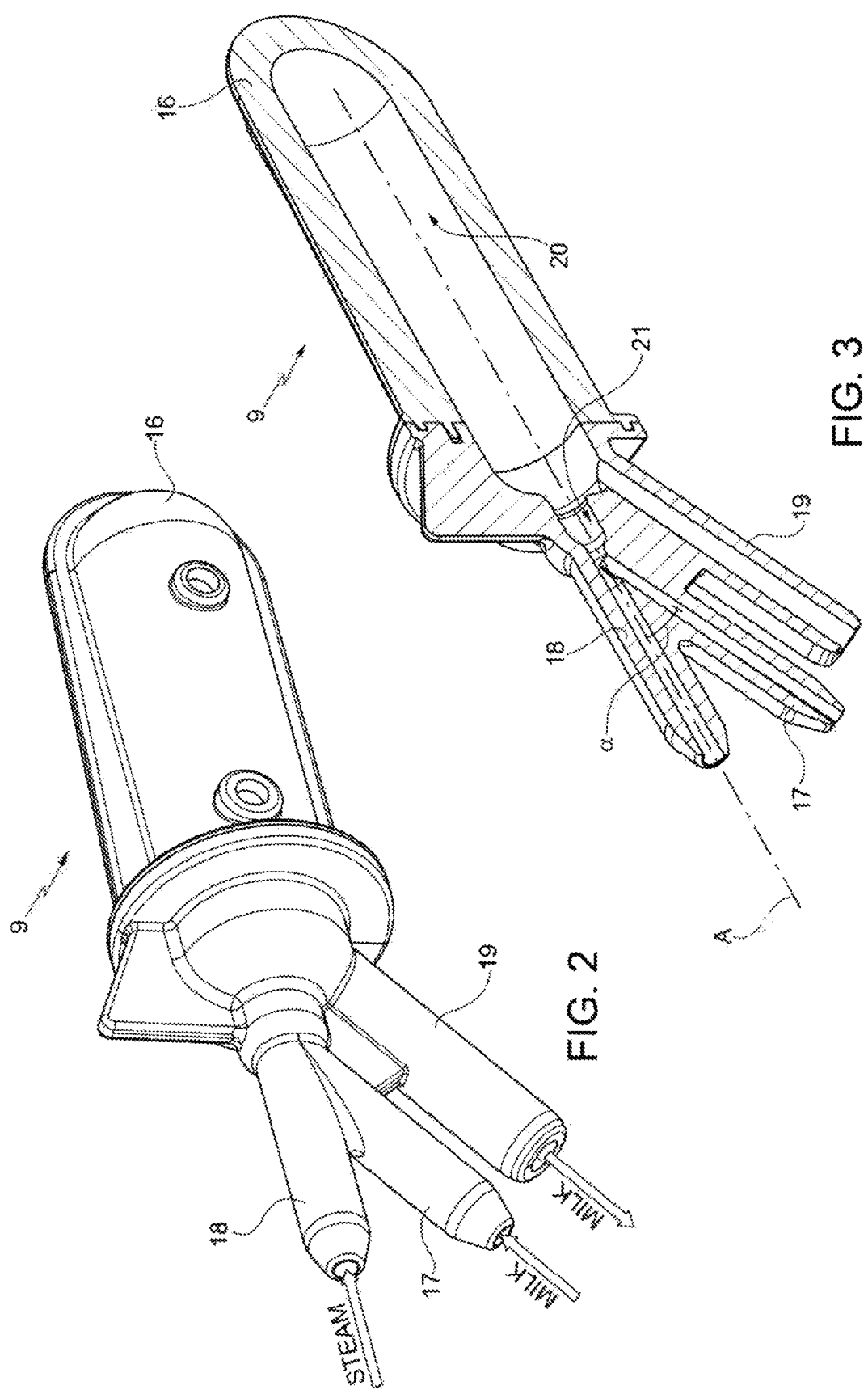

BEVERAGE VENDING MACHINE

CROSS REFERENCE TO RELATED PATENT APPLICATIONS

This application is a national stage application, filed under 35 U.S.C. § 371, of International Patent Application No. PCT/IB2018058159, filed on Oct. 19, 2018, which claims priority to European patent application No. 17197408.2 filed on 19 Oct. 2017 and Italian patent application No. 102018000001118 filed on 16 Jan. 2018, the entire content of each is incorporated herein by reference.

TECHNICAL FIELD OF THE INVENTION

The present invention relates to beverage vending machines, in particular to machines for preparing hot beverages from brewable substances brewed with pressurised hot water, such as coffee-based beverages, e.g., espresso coffee, instant coffee, long or fresh-brew coffee, etc., or tea-based beverages, and containing milk, and in particular to milk frothing aimed at producing beverages that are of high quality from both an organoleptic and aesthetic standpoint, namely that contain a right amount of milk and in which the top milk foam layer has an appropriate height and consistency.

STATE OF THE ART

As is known, beverage vending machines comprise an upper brewable substance storage area where a brewable substance storage unit is arranged, that comprises one or more containers that may be all filled with one and the same brewable substance or with different brewing substances, and that may be defined either by distinct containers or by separate compartments of a single container; an intermediate brewing area, where a brewing unit is arranged, that comprises one or more brewing groups configured to carry out either one and the same brewing process or different brewing processes, to produce either one and the same type of beverage or different types of beverage from the brewable substances contained in the containers and that may assume different forms, in particular powder, as in the case of coffee or milk, or powder and granules, as in the case of coffee, or leaves, as in the case of tea; and a lower beverage dispensing area, where a beverage dispensing unit is arranged to dispense beverages produced by the brewing unit, and comprising one or more beverage dispensing nozzles arranged so as to dispense one or different beverages into one or more distinct receptacles (glasses, cups, etc.).

Beverage vending machines further comprise a water supply circuit to supply hot or cold water to the brewing unit to produce brewed beverages, and a milk supply circuit to produce hot or cold, frothed or smooth milk to be added to brewed beverages or to produce only-milk beverages.

The milk supply circuit essentially comprises a cold milk tank, a milk pump, typically a variable speed pump, to draw from the cold milk tank an amount of milk appropriate for the beverage being prepared, and a milk frothing and heating group, in which the milk drawn from the cold milk tank may be selectively mixed with air, to froth the milk, and with steam, to heat the frothed or smooth milk to a desired temperature.

The air necessary to froth the milk may be supplied either upstream from the milk pump, so as to be sucked by the milk pump together with the milk drawn from the cold milk tank, so resulting in the cold milk being frothed in the milk pump, or downstream of the milk pump, directly in a frothing and heating member, along with the steam required to heat the milk, into which the milk is sucked by Venturi effect generated by the steam flow, which acts as a carrier. With the first technology, namely the provision of a milk pump, it is possible to froth both hot and cold milk, whereas with the second technology, namely exploiting the Venturi effect generated by the steam flow, it is only possible to froth hot milk.

The steam necessary to heat the milk and optionally to draw air by Venturi effect, necessary to froth the milk, is generated in a water heater of the water supply circuit or in a dedicated water boiler and is supplied to the milk frothing and heating member due to the pressure that the steam assumes in the water heater or in the water boiler.

WO 2017/001012 A1 discloses a valve assembly for a beverage dispenser and comprising a valve and a valve housing, the valve being arranged to be rotatably mounted within a recess of the valve housing. The valve housing includes an air inlet for supplying air to the valve, a rinsing fluid inlet for supplying the rinsing fluid to the valve, a milk supply connection for connection to a milk source, and an outlet to exhaust at least one among the air, the rinsing fluid and the milk. The valve further comprises a passage arranged to simultaneously connect the milk supply connection and the rinsing fluid inlet to the outlet.

DE 10 2006 043905 A1 discloses a frothing milk device comprising a fixed housing part and a rotating frothing member controlled by a motor. Further provided is a frothing chamber where milk and steam are mixed together. The rotating frothing member partially limits the frothing chamber, which extends inwardly in a directional manner forming an outer edge in the frothing chamber.

US 2015/097303 A1 discloses a self-cleaning milk frothing device comprising a mixing unit, a steam jet unit and a control unit. The mixing unit has a mixing chamber and a milk inlet, a detergent inlet and a frothing gas inlet communicating with the mixing chamber. The mixing chamber has a milk outlet nozzle, an upstream section, and a downstream section arranged between the upstream section and the milk outlet nozzle. The milk inlet is located between the detergent inlet and the milk outlet nozzle. The frothing gas inlet is arranged upstream of the milk inlet. The steam jet unit serves to supply steam into the mixing chamber. The control unit is configured to control the detergent flow or to stop the detergent flow in the detergent inlet.

U.S. Pat. No. 5,738,002 A discloses a fitting for combining steam, milk and air, and comprising an upper frothing body having an upper end defining an inlet, and a lower frothing body having a lower end defining an exhaust outlet. The upper and lower frothing bodies are connected to one another so as to establish a fluidic passage between the inlet and the outlet. A frothing nozzle is arranged in the fluidic passage between the inlet and the exhaust outlet. A manifold is attached to the upper frothing body to introduce milk and air into the fluidic passage. A pressure cap, a rigid bushing and a resilient bushing allow the inlet to be releasably connected to a steam source of an espresso coffee machine. A drain plug is releasably attached to the lower end of the lower frothing body to close the exhaust outlet so that the steam supplied by the espresso coffee machine is directed through the reverse drain flow manifold, so the attachment can be cleaned without requiring disassembly or disconnection from the espresso coffee machine.

WO 2012/107357 A1 discloses a mixing, heating and/or frothing device for beverage vending machines, in particular for preparing cappuccinos, which comprises a tubular body internally defining a Venturi tube extending from an inlet end, which can be associated to a steam source, to an outlet end provided with at least one beverage dispensing nozzle. A mixing chamber is defined between the converging portion and the diverging portion of the Venturi tube and is connected to at least one duct for supplying a beverage to be emulsified and to at least one duct for supplying ambient air which is drawn into the mixing chamber by the partial vacuum created by the flow of steam between the converging portion and the diverging portion to emulsify the beverage. The ducts are substantially transversal to the tubular body and the beverage to be emulsified and the air which is drawn into the mixing chamber by the partial vacuum created by the flow of steam between the converging portion and the diverging portion. The device further comprises flow control means with automatic activation for ambient air, which are associated with the air supply duct to open and close the channel for the passage of air in the direction of the mixing chamber.

OBJECT AND SUMMARY OF THE INVENTION

The Applicant has experienced that the beverage vending machines, although satisfactory in many aspects, generally require a complex calibration phase that is to be carried out by qualified skilled personnel and that is particularly burdensome with regard to the milk supply circuit in order to dispense beverages containing milk that are of high quality, both from an organoleptic and aesthetic standpoint, i.e., that contain the right amount of milk and in which the top milk foam layer has an appropriate height and consistency.

The object of the present invention is to provide an automatic beverage vending machine so improved as to allow the problems and limits indicated above to be at least partially overcome.

According to the present invention, a milk frother/heater and a beverage vending machine provided with such a milk frother/heater are provided, as claimed in the appended claims.

BRIEF DESCRIPTION OF THE DRAWINGS

FIG. 2 is a perspective view of a milk frother/heater forming part of the milk supply circuit of FIG. 1; and FIG. 3 shows a longitudinal section of the milk frother/heater of FIG. 2.

DETAILED DESCRIPTION OF PREFERRED EMBODIMENTS OF THE INVENTION

Figure 1:
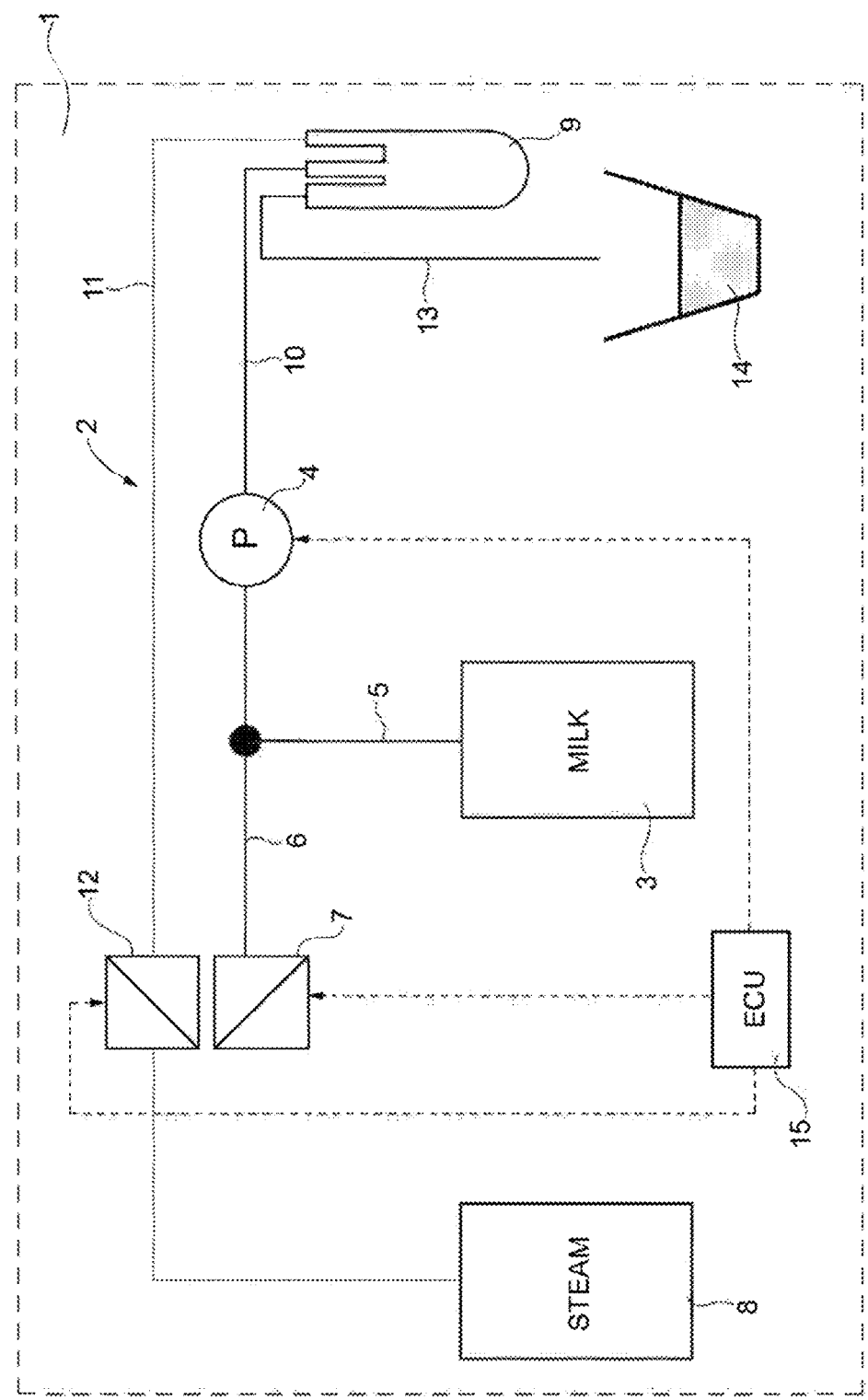
FIG. 1 shows a hydraulic diagram of a milk supply circuit in a beverage vending machine.

The present invention will now be described in detail with reference to the attached figures in order to allow a skilled person to produce it and use it. Various modifications to the described embodiments will be readily apparent to those skilled in the art and the general principles described may be applied to other embodiments and applications without however departing from the protective scope of the present invention as defined in the appended claims. Accordingly, the present invention is not to be limited in scope to the embodiments described and illustrated herein, but is to be accorded with the widest scope consistent with the principles and characteristics disclosed and claimed herein.

FIG. 1 schematically shows a milk supply circuit, referenced as a whole with reference numeral 1, in a beverage vending machine 1.

As shown in FIG. 1, the milk supply circuit 2 comprises:
a cold milk tank 3,
a variable speed milk pump 4 having a suction side fluidically connected to the cold milk tank 3 through a milk suction duct 5 to draw the milk contained therein, and to an air source (not shown) through an air supply duct 6 along which an air solenoid valve 7 is arranged, which is selectively operable, depending on the selected beverage, to supply the milk pump 4 with the amount of air required to froth the milk drawn out of the milk tank 3, and a delivery side through which smooth or frothed milk is delivered, depending on whether the milk pump 4 has been supplied with air,
a steam generator 8 having an inlet fluidically connected to a cold water source (not shown), which may be either a water container or mains water, through a water suction duct (not shown), and an outlet through which pressurized steam is delivered,
a milk frother/heater 9 having a milk inlet fluidically connected to the delivery side of the milk pump 4 through a milk supply duct 10 to receive cold milk, enriched with air or not, from the milk pump 4, a steam inlet fluidically connected to the outlet of the steam generator 8 through a steam supply duct 11, along which a steam solenoid valve 12 is arranged, which is selectively operable, depending the selected beverage, to supply the milk frother/heater 9 with an amount of steam required to heat the cold milk, enriched with air or not, from the milk pump 4, and an milk delivery outlet connected to a milk delivery duct 13, through which hot or cold, smooth or frothed milk is dispensed into a receptacle 14 (cup, glass, etc.) containing a beverage brewed by a brewing assembly of the beverage vending machine 1, and
an electronic milk control unit 15 electrically connected to the milk pump 4, the air solenoid valve 7, and the steam solenoid valve 12 to control operation of the milk pump 4, the air solenoid valve 7, and the steam solenoid valve 12 to cause the beverage vending machine 1 to produce beverages containing milk that are of high quality from both an organoleptic and an aesthetic standpoint, i.e., which contain the right amount of milk and in which the top milk foam layer has an appropriate height and consistency, regardless of the experience or the skill of the personnel responsible for calibrating the beverage vending machine 1.

In a preferred embodiment, the milk frother/heater 9 comprises a hollow body 16, which is conveniently made of plastic material and formed as a monolithic body, i.e. as a body made in one piece and not as a body formed of multiple dismountably coupled parts.

In a different embodiment shown in FIGS. 2 and 3, the body 16 is still made of plastic material and formed of two or more parts conveniently manufactured by injection moulding and firmly and permanently joined, for example by heat sealing, such as by ultrasonic welding, so as to become undismountably coupled.

The body 16 further integrally comprises a first appendage defining a milk inlet 17 shaped to be sealingly fluidically connectable to the milk adduction line 10, a second appendage defining a steam inlet 18 shaped to be sealingly fluidically connectable to the steam adduction line 11, and a third appendage defining a milk outlet 19 shaped to be sealingly fluidically connectable to the milk supply line 13.

Being monolithic or formed by undismountably joined parts and made of plastic material, the body 16 lends itself to disposable use and is easy to handle during assembly and disassembly in the beverage vending machine 1 for its replacement, and fails to require maintenance by an operator.

The milk inlet 17, the steam inlet 18, and the milk outlet 19 are arranged close to one another in one and the same area of the body 16.

In particular, the body 16 is generally elongated along a longitudinal axis A, and the milk inlet 17, the steam inlet 18, and the milk outlet 19 are all arranged at one and the same axial end of the body 16.

The body 16 internally defines a mixing chamber 20, and the milk inlet 17, the steam inlet 18, and the milk outlet 19 internally define a milk inlet passage, a steam inlet passage, and a milk outlet passage, respectively, in fluidic communication with the mixing chamber 20.

In addition, when the body 16 is formed as shown in FIGS. 2 and 3, i.e., is formed of two parts that are joined permanently so as to be undismountable, the milk inlet 17, the steam inlet 18, and the milk outlet 19 are all formed in a first part of the body 16, whereas the mixing chamber 20 is mainly formed in the second part of the body 16.

The mixing chamber 20 conveniently comprises a premixing chamber 21 arranged upstream from the mixing chamber 20 in the directions of the milk and steam inflows.

In particular, the premixing chamber 21 is formed at the axial end of the body 16 in which the milk inlet 17, the steam inlet 18, and the milk outlet 19 are formed, whereas the mixing chamber 17 extends from the premixing chamber 21 to the opposite end of the body 16.

The mixing chamber 20 and the premixing chamber 21 have different internal volumes, and in particular the volume of the mixing chamber 20 is significantly larger than that of the premixing chamber 21.

In fact, the premixing chamber 21 is designed to give rise to a preliminary step of mixing/frothing the milk and the steam, which ensures consistency over time of the quantity of the milk dispensed, whereas the mixing chamber 20 is designed to complete the mixing/frothing step started in the premixing chamber 21, guaranteeing the maintenance of the temperature of the milk dispensed.

The mixing chamber 20 has a generally elongated shape along the axis A, in particular a generally axisymmetric shape, conveniently a generally cylindrical shape.

The mixing chamber 20 also has a closed end, opposite to that in which the premixing chamber 21 is formed, generally with a hemispherical shape in order to facilitate the circulation of the milk and steam inflows therein towards the milk outlet passage.

The premixing chamber 21 also has a generally elongated shape along the axis A, in particular a generally axisymmetric shape, conveniently a generally cylindrical shape.

Conveniently, the mixing chamber 20 and the premixing chamber 21 are coaxial with each other and with the axis A.

In the embodiment shown in FIGS. 2 and 3, the milk inlet 17 and the steam inlet 18 are formed so that the milk and steam inlet passages merge with one another before ending up in the premixing chamber 21.

In a different embodiment, not shown, the milk inlet 17 and the steam inlet 18 may be formed so that the milk and steam inlet passages end up directly in the premixing chamber 21, i.e., without merging with one another before ending up in the latter.

The milk inlet 17 and the steam inlet 18 are also formed so that the milk and steam inlet passages are, at least in sections proximal to the premixing chamber 21, mutually inclined by a non-zero angle α.

Purely by way of a non-limiting example, the stretches of the milk and steam inlet passages proximal to the premixing chamber 21 are mutually inclined by an angle α ranging from 30° to 60°, preferably at 45°.

In the embodiment shown in FIGS. 2 and 3, moreover, the milk inlet 17 and the steam inlet 18 are formed so that the milk inlet passage, at least in the stretch proximal to the premixing chamber 21, is substantially parallel to the axis A, in particular substantially coaxial with the axis A, and the steam inlet passage, at least in stretch proximal to the premixing chamber 21, is transverse to the axis A, so as to form the said dangle a.

In the embodiment shown in FIGS. 2 and 3, furthermore, the milk outlet 19 is also formed so that the milk outlet passage, at least in the section proximal to the mixing chamber 20, is transverse to the axis A.

In particular, the milk outlet 19 is formed so that the milk outlet passage, at least in the stretch proximal to the mixing chamber 20, is substantially parallel to the stretch of the milk inlet passage proximal to the premixing chamber 21, at a certain distance therefrom.

In addition, the milk outlet 19 is formed so that the milk outlet passage comes out of the mixing chamber 20 at a surface connecting the mixing chamber 20 with the premixing chamber 21.

In a preferred embodiment, the milk frother/heater 9 is conveniently mounted in the beverage vending machine 1 so that, in use, the axis A is substantially horizontal and the milk outlet 19 is facing downwards, so as to facilitate the discharge of the milk by gravity, and consequently limit the possibility that frothing residues remain within the milk frother/heater 9. This orientation also shows to be particularly advantageous for the quality of the milk froth.

In a different embodiment, the milk frother/heater 9 may be mounted differently in the beverage vending machine 1, for example in such a way that, in use, the axis A is substantially vertical or assumes a different inclination.

By way of a non-limiting example, the steam inlet passage may have a diameter of between 1 mm and 2.5 mm, preferably 1.8 mm, the milk inlet passage may have a diameter of between 1 mm and 2.5 mm, preferably 1.7 mm; the milk outlet passage may have a diameter of between 1.7 mm and 3 mm, preferably 2.5 mm; the premixing chamber 21 may have a diameter of between 2.9 mm and 4 mm and a length of approximately 6 mm; and the mixing chamber 20 may have a length of approximately 55 mm and a volume of 5.8 cm$^3$.

The inclination with which the milk enters the pre-mixing chamber 21, together with the diameters of the milk and steam inlet and milk outlet passages, ensure high "texture" quality of the milk foam in the beverage in the cup.

The diameters of the milk and steam inlet and milk outlet passages and the dimensions of the mixing 20 and premixing chambers 21 also make the dispensing of the milk fluid and continuous.

Furthermore, the orientation of the milk and steam inlet and milk outlet passages, together with the shape of the mixing chamber 20, result in them being thoroughly cleansable through a washing cycle with steam and hot water controlled by the electronic milk control unit 15, without requiring further maintenance by the operator, nor a specific detergent liquid.

Lastly, the milk frother/heater 9 is constructionally simpler and hygienically better than milk frothers based on the Venturi effect, since it is devoid of any necking that, in addition to having to be designed and implemented with sufficient precision to give rise to this effect, also poses significant sanitation problems.

Lastly, it is clear that various modifications can be made to the embodiments described and shown without thereby departing from the scope of the present invention, as defined in the appended claims.

For example, the premixing chamber 21 may be omitted, and in this case what previously described with reference to the premixing chamber 21 would be applicable to the mixing chamber 20.

Furthermore, the appendages defining the milk and steam inlets 17 and 18 and the milk outlet 19 may assume different shapes from those described and illustrated herein, and in particular may be formed by a succession of two or more mutually inclined rectilinear stretches, wherein the stretches proximal to the premixing 21 and mixing chambers 20 have the above-described features, whereas the stretches distal to the premixing 21 and mixing chambers 20 may for example be all parallel to each other, so as to facilitate their fluidic connection to the milk and steam adduction lines 10 and 11 and to the milk supply line 13.

The invention claimed is:

1. A milk frother/heater for a milk supply circuit in a beverage vending machine, the milk frother/heater comprising:
  a hollow body composed of one or more undismountably coupled parts, and integrally comprises a first appendage defining a milk inlet to receive either smooth milk or a milk-air mixture, a second appendage defining a steam inlet to receive steam, and a third appendage defining a milk outlet to deliver cold or hot, smooth or frothed milk;
  wherein the hollow body internally defines a mixing chamber that is entirely hollow;
  wherein the milk inlet, the steam inlet, and the milk outlet internally define a milk inlet passage, a steam inlet passage and a milk outlet passage, respectively, in fluidic communication with the mixing chamber,
  wherein the mixing chamber has an axis (A) and comprises a first closed axial end and a second axial end opposite the first axial end;
  wherein the steam inlet passage and the milk outlet passage converge at the second axial end;
  wherein the milk inlet passage converges at the second axial end or with the steam inlet passage upstream from the mixing chamber, and
  wherein the milk frother/heater is configured for use with the milk supply circuit of the beverage vending machine.

2. The milk frother/heater of claim 1, wherein the steam inlet passage and the milk outlet passage are arranged to cause the steam inflow and the milk outflow to have substantially opposite directions, and wherein the milk inlet passage is arranged to cause the milk inflow and the steam inflow to have substantially concordant directions.

3. The milk frother/heater according to claim 2, wherein the body is generally elongated along said axis (A), and the milk inlet, the steam inlet, and the milk outlet are all arranged at the same axial end of the body, which delimits the second axial end of the mixing chamber.

4. The milk frother/heater according to claim 1, wherein the hollow body is generally elongated along said axis (A), and the milk inlet, the steam inlet, and the milk outlet are all arranged at the same axial end of the hollow body, which delimits the second axial end of the mixing chamber.

5. The milk frother/heater of claim 1, wherein, the hollow body is made of two undismountably coupled parts, the milk inlet, and wherein the steam inlet, and the milk outlet are formed in a first part, and the mixing chamber is mainly formed in the second part.

6. The milk frother/heater of claim 1, wherein the mixing chamber comprises a premixing chamber formed in the second axial end of the mixing chamber in which the steam inlet passage converges, and in which the milk inlet passage either converges directly or after merging with the steam inlet passage.

7. The milk frother/heater of claim 1, wherein the steam inlet passage, at least in a segment proximal to the mixing chamber, is substantially coaxial with said axis (A).

8. The milk frother/heater of claim 1, wherein the milk inlet passage, at least in a segment proximal to the mixing chamber, is inclined with respect to the steam inlet passage by an angle (a) ranging from 30° to 60°.

9. The milk frother/heater of claim 1, wherein the milk outlet passage, at least in a segment proximal to the mixing chamber, is inclined with respect to the steam inlet passage and substantially parallel to a stretch of the milk inlet passage proximal to the mixing chamber.

10. The beverage vending machine comprising:
  a cold milk tank,
  a milk pump having a suction side fluidically connected to the cold milk tank to draw out cold milk contained therein, and to an air source to cause the cold milk drawn out of the milk tank to be enrichable with air, and a delivery side through which either cold smooth milk or a cold milk-air mixture can be delivered, depending on whether the cold milk drawn out by the milk pump has been enriched with air or not,
  a steam generator operable to produce steam,
  and the milk frother/heater according to claim 1, having a milk inlet fluidically connected to the delivery side of the milk pump to receive the cold milk, a steam inlet fluidically connected to an outlet of the steam generator to selectively receive steam for heating the milk drawn out by the milk pump, and an outlet through which cold or hot, smooth or frothed milk is delivered, depending on whether the milk frother/heater has been supplied with cold milk enriched with air and steam or not.

11. The beverage vending machine of claim 10, wherein the milk frother/heater is mounted in the beverage vending machine so as to assume, in use, a substantially horizontal position, with the milk outlet facing downwards.

12. The beverage vending machine of claim 10, wherein the cold milk is enriched with air.

* * * * *